(12) United States Patent
Wyatt et al.

(10) Patent No.: US 6,760,207 B2
(45) Date of Patent: Jul. 6, 2004

(54) COMPRESSOR TERMINAL FAULT INTERRUPTION METHOD AND APPARATUS

(75) Inventors: Arnold G. Wyatt, Jackson, MI (US); Alex Alvey, Tecumseh, MI (US)

(73) Assignee: Tecumseh Products Company, Tecumseh, MI (US)

( * ) Notice: Subject to any disclaimer, the term of this patent is extended or adjusted under 35 U.S.C. 154(b) by 179 days.

(21) Appl. No.: 10/014,692

(22) Filed: Dec. 11, 2001

(65) Prior Publication Data

US 2002/0106945 A1 Aug. 8, 2002

Related U.S. Application Data

(60) Provisional application No. 60/254,945, filed on Dec. 12, 2000.

(51) Int. Cl.[7] ............................................. H02H 3/08
(52) U.S. Cl. .................................. 361/93.1; 361/22
(58) Field of Search ................................ 361/30, 31, 33, 361/93.5, 93.6, 93.7, 93.9, 95, 96, 93.1, 22

(56) References Cited

U.S. PATENT DOCUMENTS

| | | | |
|---|---|---|---|
| 2,875,382 A | 2/1959 | Sandin et al. .................. 317/36 |
| 3,660,718 A | 5/1972 | Pinackaers ................. 317/13 B |
| 3,742,303 A | 6/1973 | Dageford .................... 317/13 A |
| 3,786,311 A | 1/1974 | Hobson, Jr. et al. ........ 317/18 D |
| 3,846,675 A | 11/1974 | Shimp ........................ 317/33 R |
| 3,955,121 A | 5/1976 | Vahey ........................ 317/13 R |
| 4,000,446 A | 12/1976 | Vandevier et al. ......... 317/36 TD |
| 4,004,201 A | 1/1977 | DePuy ....................... 317/33 SC |
| 4,060,844 A | 11/1977 | Davis et al. .................... 361/96 |
| 4,068,283 A | 1/1978 | Russell ......................... 361/205 |
| 4,084,406 A | 4/1978 | Brenneman ................... 62/211 |
| 4,252,394 A | * | 2/1981 | Miller .......................... 439/566 |
| 4,297,741 A | 10/1981 | Howell .......................... 361/93 |
| 4,347,541 A | 8/1982 | Chen et al. .................... 361/50 |
| 4,404,612 A | 9/1983 | Hughes et al. ................. 361/31 |
| 4,547,715 A | * | 10/1985 | Li .................................. 388/822 |
| 4,689,712 A | 8/1987 | Demeyer ....................... 361/96 |
| 4,733,321 A | 3/1988 | Lindeperg ..................... 361/96 |
| 4,796,148 A | 1/1989 | Ruta ............................. 361/97 |
| 4,814,935 A | 3/1989 | Arinobu et al. ............... 361/96 |
| 4,825,330 A | 4/1989 | Walchle ........................ 361/95 |
| 4,914,541 A | 4/1990 | Tripodi et al. ................. 361/94 |
| 4,939,909 A | 7/1990 | Tsuchiyama et al. ......... 62/158 |
| 4,943,888 A | 7/1990 | Jacob et al. ................... 361/96 |
| 5,056,032 A | 10/1991 | Swanson et al. ............. 364/483 |
| 5,199,898 A | 4/1993 | Wisner ........................ 439/367 |
| 5,303,560 A | * | 4/1994 | Hanson et al. ................ 62/126 |
| 5,336,105 A | 8/1994 | Wisner ........................ 439/367 |
| 5,369,542 A | 11/1994 | Leone et al. ................... 361/94 |
| 5,943,204 A | 8/1999 | Jones et al. .................... 361/93 |
| 6,097,107 A | 8/2000 | Ikeda .......................... 307/10.7 |

FOREIGN PATENT DOCUMENTS

| | | |
|---|---|---|
| JP | 01-303018 A | 6/1989 |
| JP | 2000-156141 | 6/2000 |

OTHER PUBLICATIONS

Known formula relating to the differential temperature between the pin and the glass inslulator (copy attached).
Copy of International Search Report mailed Aug. 7, 2002.

* cited by examiner

Primary Examiner—Stephen W. Jackson
Assistant Examiner—James Demakis
(74) Attorney, Agent, or Firm—Baker & Daniels

(57) ABSTRACT

A compressor terminal fault interruption method and interrupter for disconnecting power to a compressor terminal when terminal venting failure is imminent including a current sensing circuit for sensing current provided to the terminal by a power source and outputting a sensed signal representing the current provided to the terminal and a control circuit. The control circuit includes a first circuit for outputting a reference signal representing input current much higher than locked rotor current, a second circuit connected to the current sensing circuit and the first circuit for comparing the sensed signal to the reference signal, and a third circuit connected to the second circuit for disconnecting power to the terminal when the sensed signal exceeds the reference signal, thereby preventing excessive current from reaching the compressor terminal.

6 Claims, 6 Drawing Sheets

COMPRESSOR TERMINAL FAULT INTERRUPTION METHOD AND APPARATUS

CROSS REFERENCE TO RELATED APPLICATION

This application is related to and claims the benefit under 35 U.S.C. §119(e) of U.S. Provisional Patent Application Serial No. 60/254,945, filed Dec. 12, 2000.

FIELD OF THE INVENTION

The present invention relates generally to an over-current protection method and circuit, and more particularly to a method and circuit for disconnecting power to a motor for a hermetic compressor upon detecting excess current.

BACKGROUND OF THE INVENTION

Refrigeration systems, such as residential refrigerators, use electric motor powered hermetic compressors which compress the system refrigerant according to principles well known in the art. Under certain conditions, the compressor motor in a system can enter a fault mode wherein the power lines to the compressor input terminals carry excessively high current. This high current condition may result in a phenomenon commonly referred to as "terminal venting".

Terminal venting is generally characterized by a separation of the metallic compressor input terminal pins from the surrounding insulating material in which the pins are mounted. This can occur if excessively high current is supplied to the terminals for sufficient time to destroy the glass insulating seal. The problem is exacerbated by the different thermal expansion coefficients of the pins and the insulating material thereby causing destructive tensile stresses in the glass. The end result of such a failure is damage to the hermetic seal of the compressor terminal and, in some situations, the uncontrolled release of refrigerant gas.

Many compressor manufacturers incorporate mechanical safeguards into their compressor designs to reduce the likelihood and/or the effects of terminal venting. Some conventional compressors employ robust insulating materials with high temperature breakdown characteristics. Other compressors include covers which enclose the compressor terminals.

Conventional fuse-based interrupt circuits for similar applications do not adequately prevent terminal venting because such circuits are typically triggered by a prolonged presence of current levels substantially lower than the current levels associated with terminal venting. For example, when the compressor rotor becomes locked, the compressor motor draws high current (commonly referred to as "locked rotor current") such as 20 amps, for example, but not nearly as high as the current associated with terminal venting, which is typically in excess of 50 amps. Conventional interrupt circuits interrupt power to the compressor to protect the motor coils when the current draw of the compressor motor is in the range of locked rotor currents, and is sustained for a sufficiently long period of time. While the exceptionally high current associated with terminal venting would typically trigger a conventional interrupt circuit, the relatively slow response time of such circuits requires a prolonged application of this high current. Thus, damage to the compressor terminals may occur long before a conventional interrupt circuit is triggered.

SUMMARY OF THE INVENTION

It has been determined that if the temperature differential between the pin and glass exceeds a given threshold for a particular terminal, the resulting tensile stresses in the glass will cause failure of the pin-to-glass seal and result in terminal venting. In accordance with the method of the present invention and the particular exemplary circuit implementation shown, the current flowing through the terminal is detected. If the detected current exceeds a threshold level that, unless substantially immediately terminated, will cause the pin/glass temperature differential to rapidly exceed a threshold level resulting in glass stresses that will cause the pin-to-glass failure and terminal venting, power through the terminal is immediately terminated. The threshold current level is much higher than locked rotor current for the compressor motor, preferably at least two times the locked rotor current. It has been found that once the pin current exceeds a given threshold for a particular terminal, that even if the current rise is no higher, the pin and glass temperatures continue to rise and the pin/glass temperature differential where failure of the pin-to-glass seal occurs will rapidly be reached. Therefore, the threshold current selected for a particular terminal must be lower than that which correlates to simultaneous pin and glass temperatures at the failure level.

The present invention can be implemented by an exemplary protection circuit connected in series between the power lines and terminal of the compressor which detects the presence of a motor fault or other over-current condition and disconnects power to the terminal to prevent terminal venting due to this condition. The circuit generally includes a line-connected power supply for powering the circuit, a current sensor for sensing the current drawn by the compressor motor, and a control circuit for disconnecting power to the motor when a fault is detected. The circuit may include an audible or visual alarm to indicate the presence of a fault. Additionally, since the present protection circuit is connected in-line with the power connections to the compressor and external of the compressor housing, existing compressors may readily be retrofitted to obtain the protection against terminal venting provided by the present invention.

The method and circuit of the present invention protect the compressor terminals, as opposed to the motor coils, by quickly disconnecting power to the compressor, but only upon detection of exceptionally high current levels. This high threshold permits simultaneous operation of conventional interrupt circuits and prevents "nuisance triggering" as a result of the large current demands at motor start-up or current noise spikes that may occur during operation. While the current threshold of the present protection circuit is quite high relative to the locked rotor current, damage to the compressor terminals is nonetheless prevented because the response time of the circuit is substantially faster than conventional interrupt circuits. For example, current is terminated within 20 milliseconds of detecting the preset current threshold. Thus, the exceptionally high current is removed from the compressor terminals before the temperature of the terminal pin causes damage to the pin-to-glass seal.

BRIEF DESCRIPTION OF THE DRAWINGS

These and other features of the present invention will become more apparent and the invention will be better understood upon consideration of the following description of the accompanying drawings wherein.

DESCRIPTION OF EMBODIMENTS OF THE INVENTION

The embodiment of the invention described herein is not intended to be exhaustive or to limit the invention to the precise forms disclosed. Rather, the embodiment selected for description has been chosen to enable one skilled in the art to practice the invention.

Figure 1:
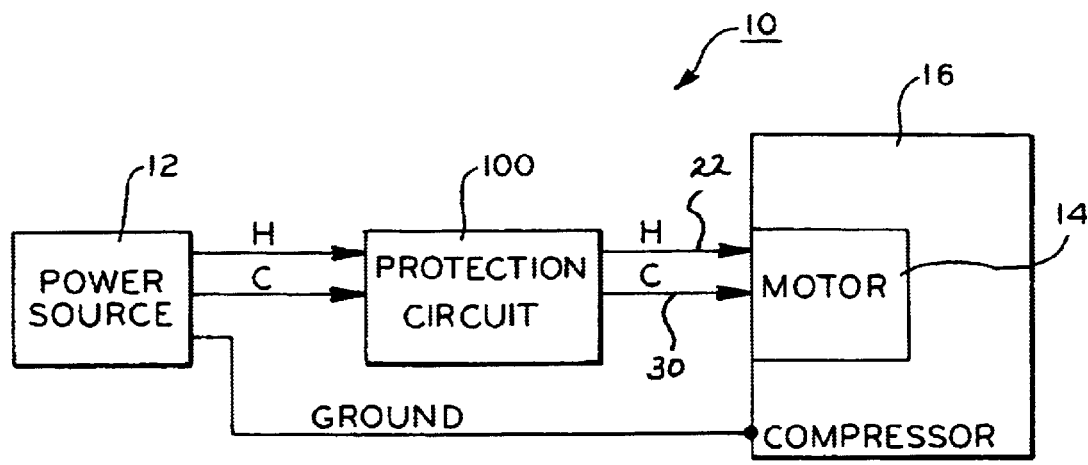
FIG. 1 is a block diagram of a portion of a refrigeration system with an over-current protection circuit according to the present invention.

Referring now to FIG. 1, in a typical refrigeration system 10, power is supplied from a power source 12, such as a wall outlet, to a compressor motor 14 which drives a compressor 16. The present invention may be applied to any hermetic compressor used, for example, in air conditioning and refrigeration applications such as the numerous models of compressors commercially available from the assignee of the present application, Tecumseh Products Company. For example, compressor 16 could be of the type disclosed in U.S. Pat. No. 5,199,898 which is assigned to the assignee of the present invention and is expressly incorporated herein by reference. According to the present invention, a protection circuit 100 is connected between power source 12 and terminal assembly 18 for the compressor 16 and motor 14 to detect an excessive current draw and disconnect power in response thereto. The power connections shown in FIG. 1 include a high line, a common line, and a ground line. As will be explained further below, while protection circuit 100 will be described as disconnecting the common line to compressor motor 14 upon detecting an over-current condition, protection circuit 100 could readily be adapted to disconnect either the high signal or the common signal provided to motor 14.

Figure 2:
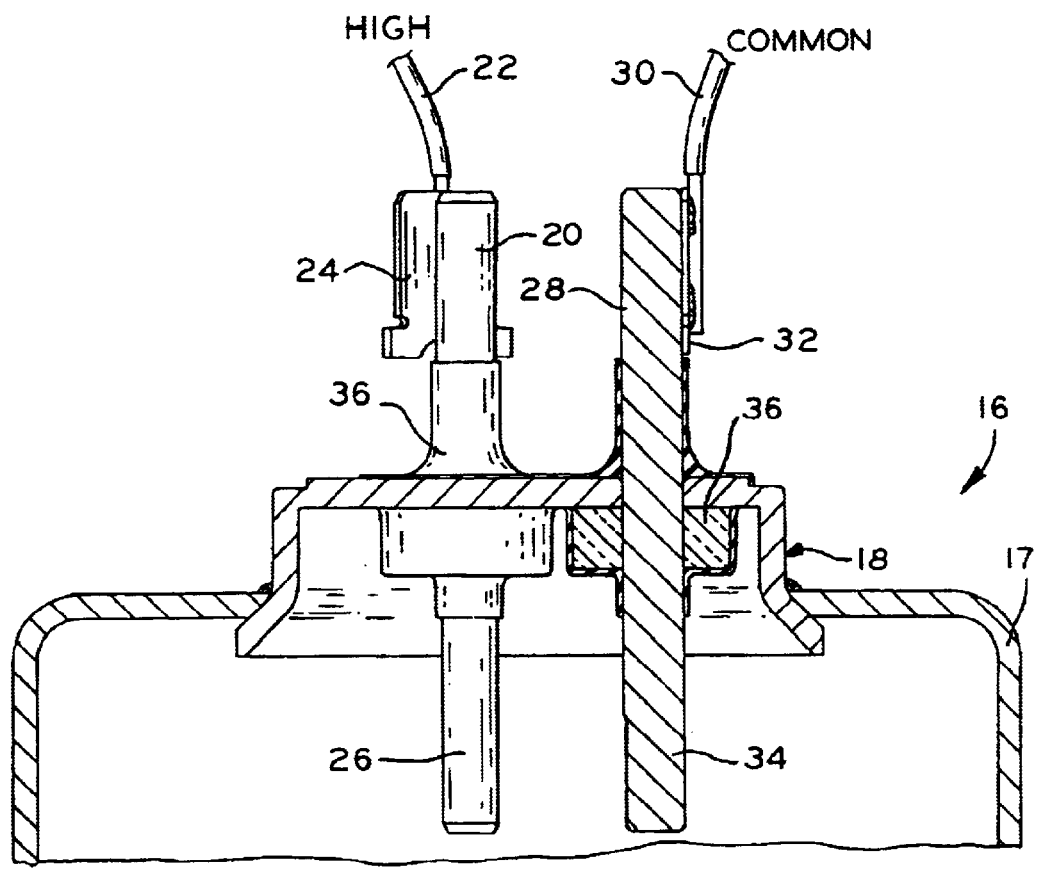
FIG. 2 is a cross-sectional view of a compressor showing the compressor input terminals.

Referring now to FIG. 2, the configuration of the compressor input terminals is shown. Compressor 16 generally includes a hermetic housing 17 and a terminal assembly 18 in which are mounted three terminals (only two shown). Terminal 20 carries the power high line from power source 12 to compressor motor 14 through wire 22, connector 24, and pin 26. Similarly, terminal 28 carries the common line from power source 12 through wire 30, connector 32, and pin 34. Terminal pins 26 and 34 are mounted within housing 18 and glass insulating material 36 according to principles well known in the art. A terminal venting condition is characterized by separation between any of terminal pins 26, 34, or the neutral terminal pin (not shown) from glass insulating material 36, potentially resulting in an uncontrolled release of refrigerant from compressor 16. The excessive current drawn which may lead to such a failure is prevented from reaching compressor 16 by over-protection current 100 as described below.

Figure 3:
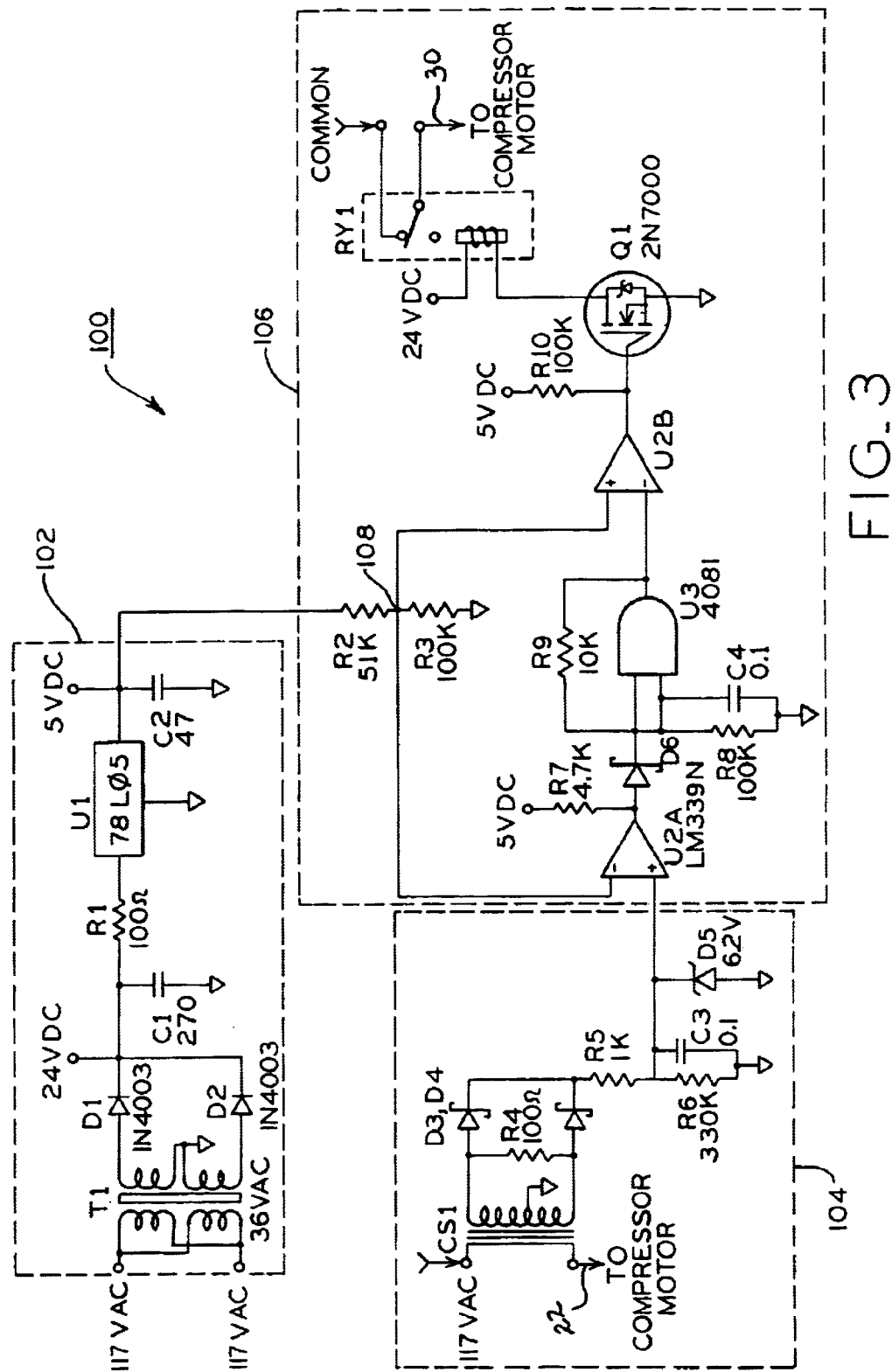
FIG. 3 is a schematic diagram of an over-current protection circuit according to an exemplary embodiment of the present invention.

FIG. 3 shows a protection circuit 100 which can be used to implement the method and apparatus of the present invention. Circuit 100 includes a regulator circuit 102 to establish a fixed DC voltage for comparing to a voltage representing the current drawn by compressor motor 14, a current sensing circuit 104 for deriving this representative voltage, and a control circuit 106 for disconnecting power to compressor 16 as will be further described below. Regulator circuit 102 includes a transformer T1, shown as a 36 volt device, the primary side of which is connected to 117 VAC power from power source 12 (FIG. 1). The output signal from the secondary side of transformer T1 is rectified by diodes D1, D2 to produce a 24 VDC signal. This 24 VDC signal is used to energize relay RYI as will be further described below. The 24 VDC signal is filtered by capacitor C1 and passed through a 5 volt regulator U1 to produce a 5 VDC signal at the output of regulator circuit 102. This signal is further filtered by capacitor C2, and passed through a voltage divider network in control circuit 106 including resistors R2, R3.

The output node 108 of voltage divider R2, R3 is the reference voltage used to set a maximum threshold for the acceptable current provided through terminal 18 to compressor motor 14. As indicated above, this threshold reference voltage is set such that the increased current draw associated with motor start-up or other typical operating conditions does not result in activation of circuit 100. Moreover, the reference voltage is set such that triggering of circuit 100 occurs only upon detection of motor 14 current substantially higher than locked rotor current. The threshold current level causing activation of the disconnect circuit is that current which, unless substantially immediately terminated, will cause the pin/glass temperature differential to rapidly exceed a threshold level resulting in glass stresses that will cause pin-to-glass failure and terminal venting. This threshold current is much higher than locked rotor current for the compressor motor, for example, at least two times the locked rotor current. For a typical terminal, such as a No. 40387 terminal provided on a TP or TW series compressor having a 200–300 watt motor available from Tecumseh Products Company, the threshold current at 115 volts is 52 amps.

As indicated earlier, it has been found that once the pin current exceeds a given threshold for a particular terminal, even if the current rises no higher or is terminated, the pin and glass temperatures continue to rise and the pin/glass temperature differential where failure of the pin-to-glass seal occurs will rapidly be reached. Accordingly, the threshold current selected for a particular terminal must be lower than that which correlates to simultaneous pin and glass temperatures at the failure level.

The 117 VAC high line is passed through current sensor CS1 of current sensing circuit 104 to compressor motor 14 (compressor terminal 20). Current sensor CS1 is a conventional torridly current sensor, and is connected to resistor R4 and rectifier D3, D4. Since small voltage changes are produced by current sensor CS1 response to current changes on the 117 VAC power line, Schottky diodes are used for rectifier D3, D4 to minimize the forward voltage drop incurred by the output voltage of current sensor CS1. As current through current sensor CS1 increases, the voltage at the output of rectifier D3, D4 also increases. This signal is passed through resistor R5 and filtered by resistor R6 and capacitor C3. The filtered signal is connected to the positive input of comparator U2A of control circuit 106. A diode D5 is connected between the positive input of comparator U2A and ground to protect comparator U2A in the event a large voltage is generated by current sensor CS1. Specifically, if the voltage at the positive input of comparator U2A exceeds the 6.2 voltage breakdown voltage of diode D5, diode D5 will reverse bias and conduct to ground, thereby protecting the remainder of circuit 100.

The negative input to comparator U2A is connected to the reference voltage at node 108 of voltage divider R2, R3. The output of comparator U2A is connected to pull up resistor R7 which is connected to the 5 VDC output power from regulator circuit 102. The output of comparator U2A is also connected to Schottky diode D6 which isolates comparator U2A from an AND gate U3. Both inputs of AND gate U3 are connected together and connected to the filter including resistor R8 and capacitor C4. A hysteresis resistor R9 is connected from the output of AND gate U3 to the inputs. The output of AND gate U3 is also connected to the negative input of comparator U2B, the positive input of which is connected to the reference voltage at node 108 of voltage divider R2, R3. As will be further explained below, comparator U2B functions as an inverter.

The output of comparator U2B is pulled up by resistor R10 and connected to the gate of transistor Q1. The source of transistor Q1 is connected to ground and the drain is connected to the low side of the solenoid coil of relay RY1. The high side of the solenoid coil is connected to the 24 VDC signal from rectifier D1, D2 of regulator circuit 102. Relay RY1 is shown in its energized configuration wherein the common line from power source 12 (FIG. 1) is passed through the switch of RY1, terminal 28 of compressor 16, to compressor motor 14.

In operation, when excess current is drawn by motor 14 through the 117 VAC high line, current sensor CS1 produces an output voltage which is rectified by diodes D3, D4 and provided to the positive input of comparator U2A after filtring resistor R6 and capacitor C3. If the voltage exceeds the reference voltage (from note 108 of voltage divider R2, R3) at the negative input to comparator U2A, comparator U2A outputs a positive logic signal. Accordingly, a positive logic signal is present at both inputs to AND gate U3, causing a positive output. The combination of Schottky diode D6 and hysteresis resistor R9 latch the output of AND gate U3 in the logic high state. A logic high state is therefore present at the negative input to comparator U2B. Control circuit 106 is designed such that this signal exceeds the reference voltage at the positive input to comparator U2B. Accordingly, comparator U2B outputs a logic low signal disabling transistor Q1. The path to ground for the solenoid coil of relay RY1 is thereby removed, de-energizing relay RY1 such that relay RY1 switches to an open position.

When relay RY1 opens, power is disconnected to compressor motor 14, and the current passing through current sensor CS1 quickly goes to zero. This rapid disconnect prevents the excessive current at terminals 20, 28 (and the third terminal, not shown) from heating terminals 20, 28 to a temperature resulting in terminal venting. As should be apparent to one skilled in the art, a relationship exists between the reference voltage and the speed at which circuit 100 disconnects power to compressor motor 14 (i.e., the response time). Since circuit 100 is designed to prevent damaging temperature levels at terminals 20, 28, the higher the reference voltage is set, the faster the required response time. As a corollary, a slower response time may be used (requiring a longer duration high current condition) if a lower reference voltage is set. For the particular example described above, the time between detection of the threshold current and the energizing relay RY1 is 22 milliseconds.

When power is disconnected to compressor motor 14 and current sensor CS1 goes to zero, the positive input to comparator U2A falls below the negative input (the reference voltage from voltage divider R2, R3), causing comparator U2A to output a logic low signal. As mentioned above, however, the output of AND gate U3 remains in a logic high state since Schottky diode D6 isolates the output of comparator U2A from the inputs to AND gate U3, and hysteresis R9 feeds back the logic high output of AND gate U3 to its inputs. Accordingly, once the reference voltage is exceeded by the voltage representing the current sensed by current sensor CS1, circuit 100 disables relay RY1 and maintains relay RY1 in a disabled state, thereby disconnecting power from compressor motor 14, until power is removed from circuit 100 and re-applied. Thus, when circuit 100 disables compressor motor 14, compressor motor 14 remains disabled until it is properly serviced.

Figure 4:
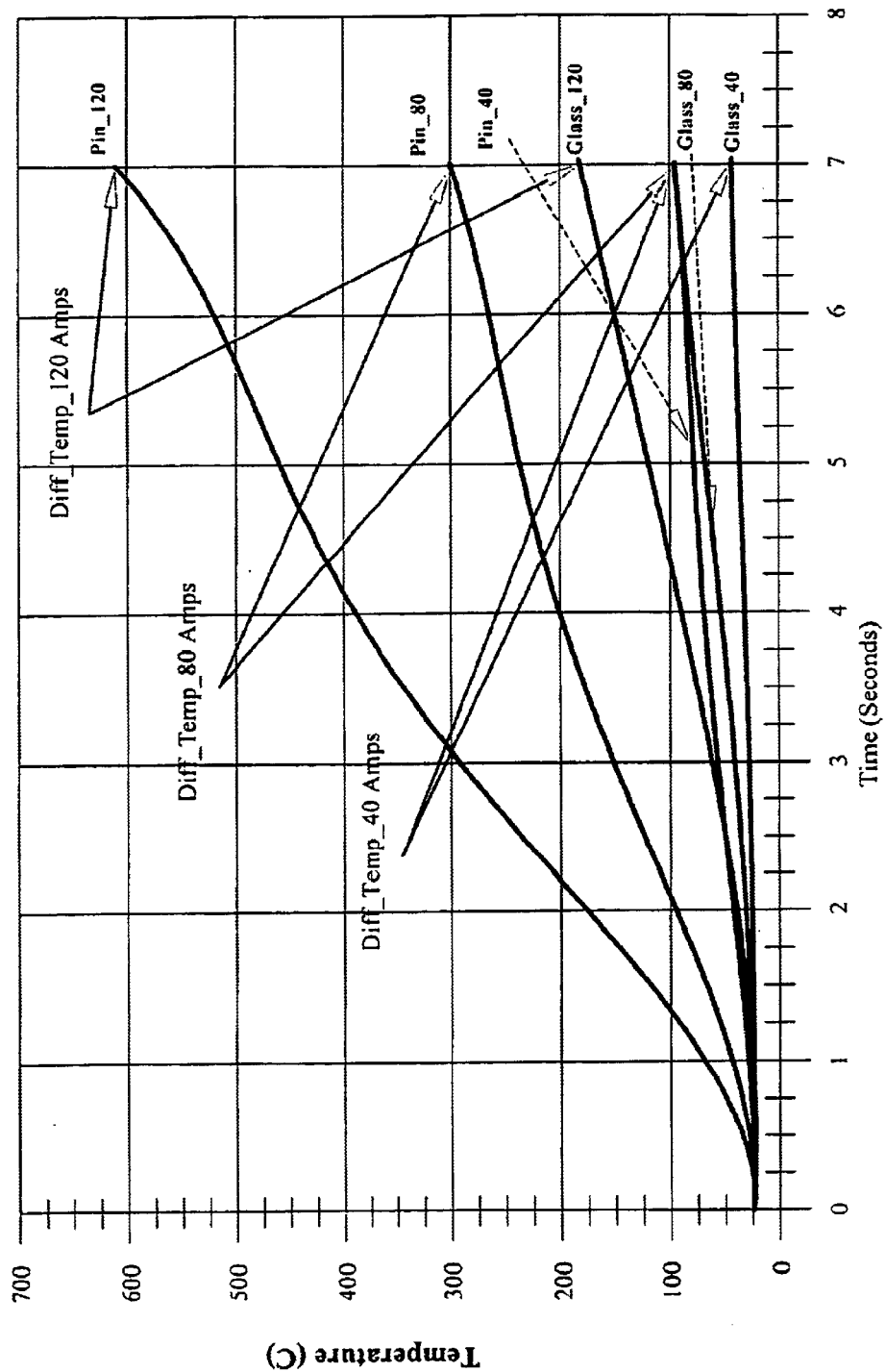
FIG. 4 is a graphical representation of the temperatures of the pin and glass when high current is applied across the pin.
Figure 5:
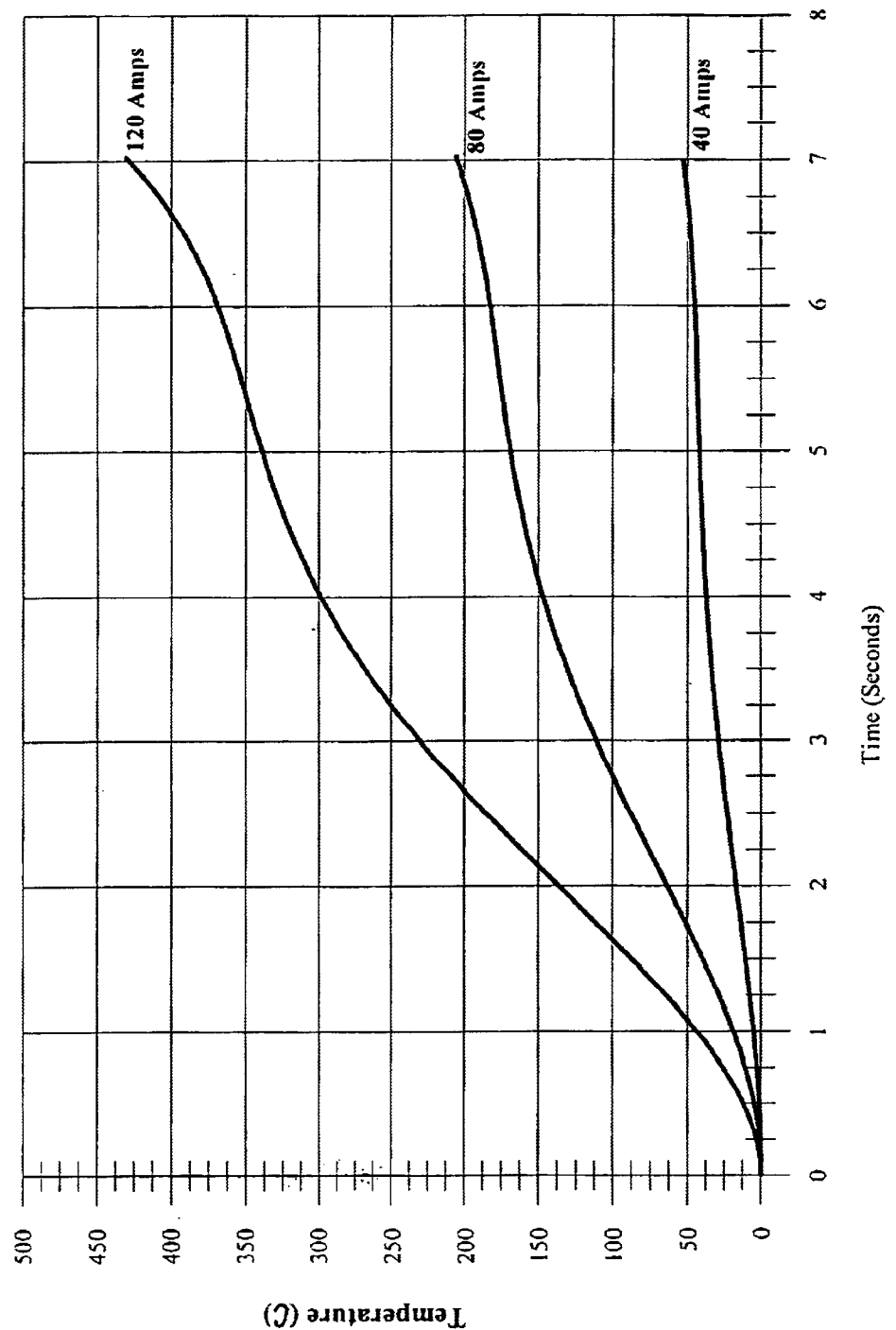
FIG. 5 is a graphical representation of the differential temperature of the pin and glass of the hermetic terminal for different currents.
Figure 6:
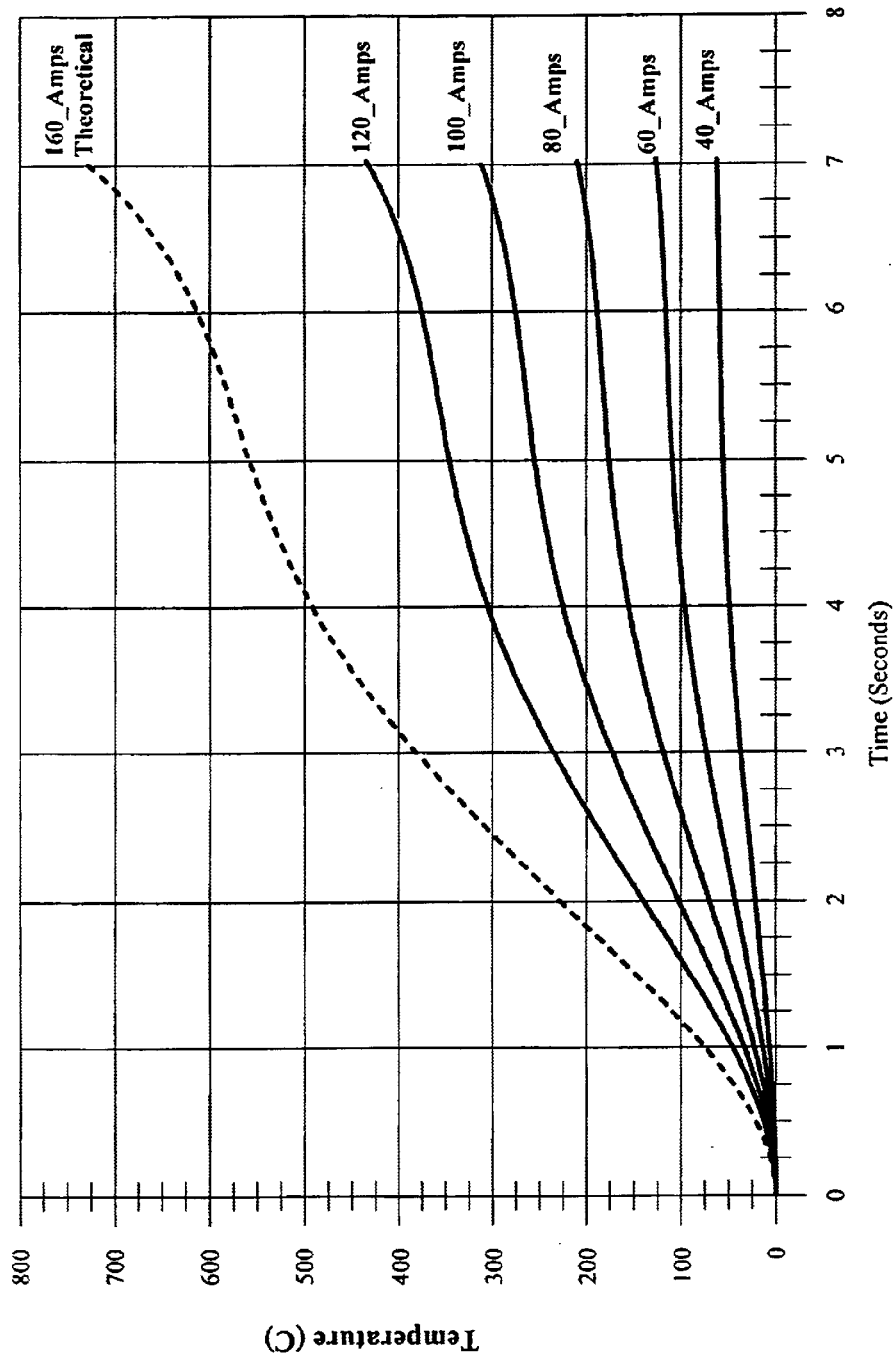
FIG. 6 is a further graphical representation of the differential temperature of the pin and glass of the hermetic terminal when different currents are applied.

Referring now to FIG. 4, there is provided a graphical representation of the pin and glass temperatures as a function of time when different currents are applied to terminal pin 26 or 34. As can be seen, the higher the pin current the more rapid the rise in pin temperature and concomitantly the temperature differential between the pin and glass. FIG. 5 illustrates this rise in pin/glass temperature differential, and particularly for high current levels, such as 120 amps, the temperature differential curve rises very sharply after only one second following initiation of the high current condition. FIG. 6 is a similar representation but includes additional current levels in a mathematical simulation.

Figure 7:
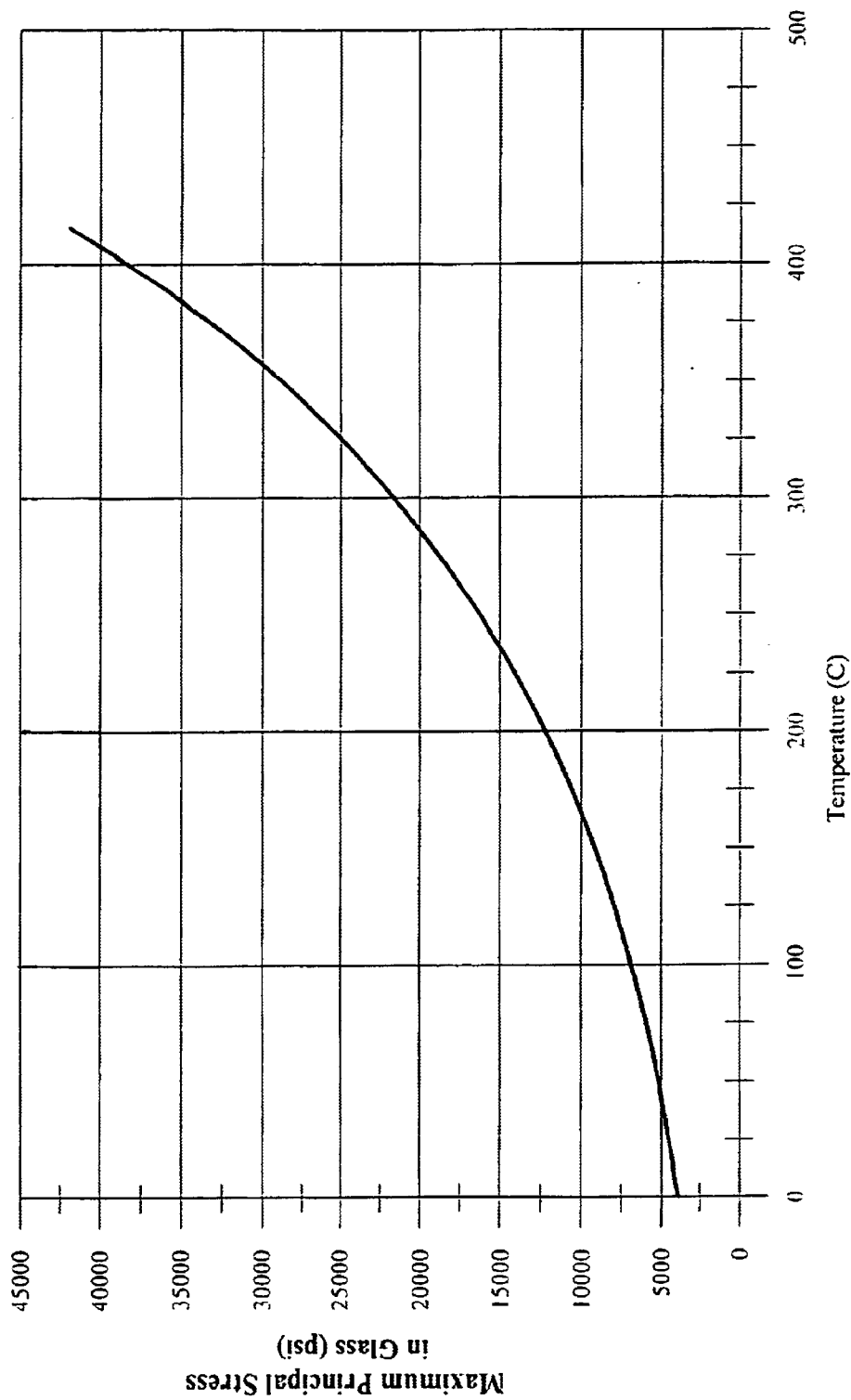
FIG. 7 is a graphical representation of the maximum principal tensile stress in the hermetic terminal when different currents are applied for seven seconds.

FIG. 7 shows graphically the rapid rise in maximum principal stresses in the glass as the temperature differential between the glass and pin increases. As is quite evident, the curve is substantially exponential thereby indicating that unless current is terminated at a very early time when the threshold current is detected, rapid heating and failure of the pin-to-glass seal will occur.

Utilizing the data from FIG. 5, the following mathematical model equation describing the process to prevent terminal venting was obtained:

$$T = a_1 i^{b_1} t^4 + a_2 i^{b_2} t^3 + a_3 i^{b_3} t^2$$

In this equation, T is tile differential temperature between the pin and the glass in degrees Celsius, i is current through the pin in amperes and t is the amount of time in seconds current has been applied. Once the maximum temperature differential between the pin and glass is determined for a particular terminal, the equation can be solved for current in order to set the threshold level in circuit 100.

The experimental data to generate and validate the curves discussed above was obtained by applying different levels of current through the terminal and measuring the temperature of the glass and pin. The constants $a_1$, $a_2$, $a_3$, $b_1$, $b_2$, $b_3$ are derived from the curves and are used for the particular terminal construction tested. For the aforementioned terminal, the constants are as follows:

$a_1 = 1.079 \times 10^{-4}$ $a_2 = 2.420 \times 10^{-3}$ $a_3 = 1.4447 \times 10^{-2}$ $b_1 = 1.8875$ $b_2 = 1.8000$ $b_3 = 1.7335$ Maximum allowable glass stress and therefore maximum allowable pin-to-glass temperature differential is determined by measuring the electrical isolation resistance of the pin-to-glass interface, which will be indicative of the glass stress. For example, if the maximum allowable stress for the particular terminal tested was chosen to be 12,500 psi, this correlates to a pin/glass differential temperature of about 210° C. (FIG. 7). As can be seen in FIG. 5, this temperature differential would be reached under 80 amp current conditions. Since a pin-to-glass temperature differential of 55° C. results from twice the locked rotor current of 40 amps, 52 amps was selected as the threshold current level for power interruption.

The data set forth above is only exemplary and applies to a particular terminal. However, the same technique can be applied to any terminal by taking temperature and isolation resistance measurements at a variety of pin currents until the maximum allowable pin/glass temperature differential is attained.

Although a discrete circuit has been disclosed to perform the method of the present invention, other implementations are obviously possible, such as implementation by way of a microprocessor programmed to respond to the current input signal and provide an output signal to disconnect the motor upon the threshold current level being sensed. Although relay RY1 is shown in the exemplary system as the device for disconnecting power between the power source and the compressor motor 14, this could be replaced by an normally open relay held closed by the circuit, a latching relay, piezoelectric relay, bi-metal relay or solid state relay-type device, such as an SCR, triac, FET, etc. It may also be desirable to have the protection circuit 100 be non-resettable. Other potential implementions of the current sensor CS1 can be a transformer isolated hall effect device, GMA, etc, or other current sensing means well known in the art.

Although the present invention has been shown and described in detail, the same is to be taken by way of example only and not by way of limitation. Numerous changes can be made to the embodiments described above without departing from the scope of the invention. For example, circuit 100 could readily be reconfigured to monitor the power demand of compressor motor 14 in terms of watts versus time by way of the technique disclosed in pending U.S. application Ser. No. 09/697,631 filed Oct. 26, 2000, which application is expressly incorporated herein by reference. This application is therefore intended to cover any variation, uses, or adaptations of the invention using its general principles. Further, this application is intended to cover such departures from the present disclosure as come within known or customary practice in the art to which this invention pertains.

What is claimed is:

1. A method of preventing damage to the terminal of a hermetic compressor having a motor, said method comprising the steps of:

sensing current draw through the terminal;

monitoring a signal representing the sensed current draw;

comparing the monitored signal to a reference signal corresponding to a current draw substantially greater than a current draw associated with a locked rotor condition of the motor; and rapidly disconnecting power to the terminal when the monitored signal exceeds the reference signal to prevent heating of the compressor terminal to a level likely to cause terminal venting;

wherein the reference signal corresponds to current draw that will subsequently heat the terminal to a level that the differential temperature between a pin and surrounding glass of the terminal exceeds a level where stresses in the glass will cause failure of the pin/glass seal.

2. The method of claim 1 wherein the reference signal corresponds to a current draw greater than twice the current draw associated with a locked rotor condition of the motor.

3. The method of claim 1 wherein the current draw is sensed externally of the compressor.

4. A method of preventing damage to the terminal of a hermetic compressor having a motor, said method comprising the steps of:

sensing power draw through the terminal;

monitoring a signal representing the sensed power draw;

comparing the monitored signal to a reference signal corresponding to a power draw substantially greater than the power draw associated with a locked rotor condition of the motor; and rapidly disconnecting power to the compressor terminal when the monitored signal exceeds the reference signal to prevent heating of the compressor terminal to a level likely to cause terminal venting;

wherein the reference signal corresponds to power draw that will subsequently heat the terminal to a level that the differential temperature between a pin and surrounding glass of the terminal exceeds a level where stresses in the glass will cause failure of the pin/glass seal.

5. The method of claim 4 wherein the reference signal corresponds to a power draw greater than twice the power draw associated with a locked rotor condition of the motor.

6. The method of claim 4 wherein the power draw is sensed externally of the compressor.

\* \* \* \* \*